May 27, 1958  F. R. OFNER  2,835,985
RECOVERY OF FLOUR MILL WASTES
Filed Dec. 13, 1952
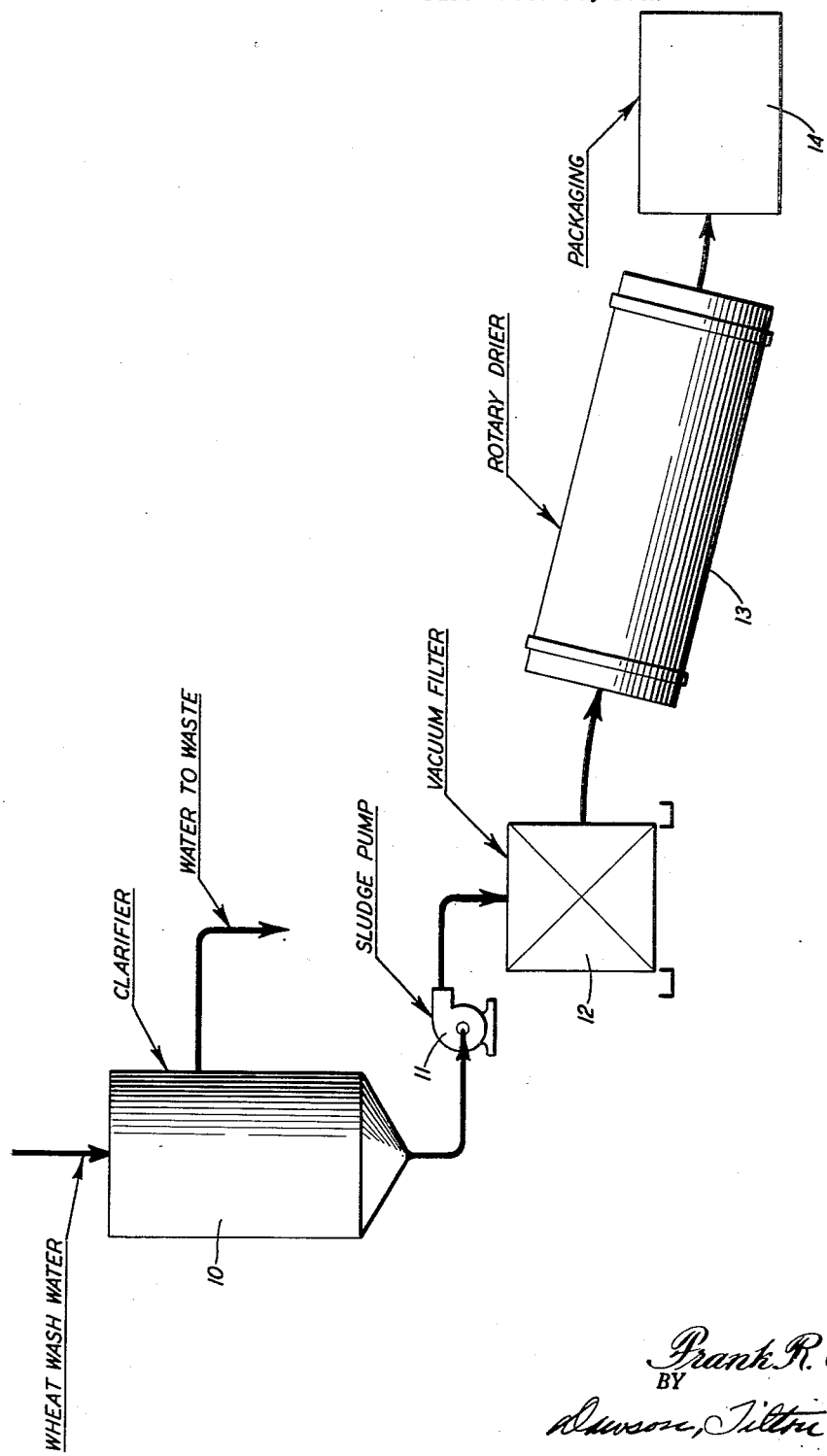
INVENTOR:
Frank R. Ofner,
BY
Dawson, Tilton & Graham,
ATTORNEYS.

United States Patent Office 2,835,985
Patented May 27, 1958

2,835,985

RECOVERY OF FLOUR MILL WASTES

Frank R. Ofner, Spokane, Wash., assignor to Industrial Processes, Incorporated, Spokane, Wash., a corporation of Washington Application December 13, 1952, Serial No. 325,773

3 Claims. (Cl. 34—14)

This invention relates to the recovery of flour mill wastes, and more particularly to a process for recovering a dry nutrient from the wash water wastes of flour mills.

In a large percentage of flour mills the wheat used in preparing flour is cleaned prior to milling it into flour, by a washing process. In the process of washing, the wheat is subjected to a water bath and, inadvertently, a large quantity of broken, cracked, and whole wheat is carried away with the waste wash water. Since a minimum amount of water is used in the washing process, a relatively large concentration of wheat solids is present in the waste wash water.

Generally the washing of the wheat grain takes place prior to the grain's being hulled and the whole grain with the hulls thereon is dumped into a water stream and carried thereby into a centrifugal separator that ordinarily consists of a rotating hollow cylinder having a plurality of apertures along the outer surface through which the broken and cracked grain as well as some of the hulls are carried. The grain products that will later be hulled and milled into flour are carried onwardly by the water stream through the center of the rotating cylinder. The wastes that are forced through the apertures in the rotating tank have at this point a paste-like consistency with a water content of about 60% to 75%.

These wastes have heretofore been disposed of as valueless and have been carried away from the centrifugal separator, after being discharged therefrom, by a stream of water that usually empties into a waste disposal system. The wastes are, however, high in food value since, excluding the actual wheat seed itself, they include the wheat heart which contains about 22% protein and 8% fat, and the hulls which are about 12% protein and 3½% fat.

Because of the food value in these flour mill wastes, prior attempts have been made to recover these products as an animal nutrient or feed. The attempts have been fruitless because the recovery could not be accomplished economically and the recovered products had a very low protein and fat content and therefore had little utility as a nutrient.

It is only economically feasible to carry the flour mill wastes from the centrifugal separator by means of a water stream. Thus the wastes to be recovered must be separated from a rather large amount of water and the water separation can occur practically only in a clarifier or settling tank of some type. However, wheat is rich in both starch and gluten, and the gluten as is well known is a proteid or sticky albumin. Upon sitting for prolonged periods the proteids or proteins and starches are dissipated from the wheat by what is believed to be a leaching action and appear in the water as a thick gelatin or pasty mass. When this occurs and the wastes are introduced into a clarifier, the thick paste or gelatin clogs the filters and pumps and generally impedes the settling action of the clarifier. It is therefore virtually impossible to separate the fluids from the solids in the clarifier and certainly any separation that occurs is not efficient and therefore not economical. Further, since the fats and proteins have been dissipated from the wheat solids, the recovered products are therefore of practically no value as a nutrient and are not advantageously usable as an animal feed. I have discovered a practical process for recovering flour mill wastes wherein a valuable feed is obtained economically.

An object of the invention is to recover a dry nutrient from flour mill wastes that is valuable as a feed. Another object of the invention is to provide an economically practicable process for treating flour mill waste water to recover a dry feed therefrom having a relatively high fat and protein content and an attractively low ash content. A further object of the invention is to provide a process for recovering a valuable dry nutrient from wheat wash water wastes of flour mills that involves only a minimum capital expenditure for recovery equipment. Still a further object of the invention is to utilize a clarifier in a process for recovering flour mill wastes and wherein the process is such that the formation of paste-like or gelatin-like masses is obviated so that clogging of the filters and pumps, etc., of the equipment used is avoided. Other objects and advantages will appear as the specification proceeds.

The drawing is a flow sheet illustrating in general the equipment used in the steps of the process.

The starting material is wheat wash water comprising essentially water and wheat solids including cracked, broken, and whole wheat. This starting material is flour mill wastes and is normally disposed of as valueless though it contains a relatively high concentration of wheat solids. For example, in even very small flour mills using water for the washing of the wheat grain the waste solids amount to about a ton per day.

I have discovered that if the recovery of the flour mill wastes is started within about 16 hours and up to about 24 hours, the dissipation of the proteins and fats of the wheat into the waste water is not sufficient to render the recovered material valueless as an animal nutrient. I have also discovered that if the recovery process is started within about this time, the formation of a paste-like mass within the wastes has not progressed to such an extent that it is almost impossible to utilize a clarifier in thickening the flour mill wastes as a step in the recovery thereof. Therefore, within about 16 hours from the time the wheat wash water wastes are formed, I introduce the wastes into a clarifier or settling tank 10.

The wastes are retained in the clarifier 10 until the material has thickened, and the thickening takes places in about 10 to 30 minutes. The relatively clear waste water that is a by-product of the thickening in the clarifier is drawn off and discharged. The thickened material is pumped through a sludge pump 11 to a filter 12 that may be a vacuum type filter. In the event the flour mill wastes are permitted to stand for a considerable period prior to being fed into the clarifier 10, preferably the material is pumped immediately upon thickening into the filter 12. It is apparent that the flour mill wastes may be immediately introduced into the clarifier 10 upon their formation, and in such case, the wastes may be allowed to stand in the clarifier for a substantial period without danger of excessive protein and fat dissipation and before undue formation of the undesirable gelatinous or paste-like masses occurs.

In the filter 12 the moisture content of the thickened wastes is further reduced to around 65% (which is fairly dry to the touch). The excess water is drawn off from the filter and the relatively dry products are transferred into a drier 13. The drier 13 may be a rotary type kiln and the moisture content of the solids is further reduced to about 10–15% in this unit.

From the drier 13, the solids are introduced into a suitable packaging unit 14 where they are packaged as a dry nutrient immediately usable and salable as a dry feed having a relatively high fat and protein content and a relatively low ash content. The material is taken from the drier in a dry cake form and, if desired, the cakes may be crushed or broken prior to packaging.

It is apparent that the apparatus described is conventional and the particular apparatus employed may be chosen to meet the economics of any particular installation.

Specific examples of the process may be set out as follows:

Example I

Flour mill wastes consisting of water and 2,000 pounds of solids were introduced, about 10 hours after their formation, into a clarifier where they remained for about 15 minutes to allow thickening. After thickening, the wastes were passed by a sludge pump to an Eimco vacuum filter and the water content reduced to 63.5%. The thickened and partially dry material was then passed to a steam heated rotary type drier and the moisture content further reduced to 13.5%. When taken from the drier, the material was a dry cake and was then packaged. The temperature in the drier was maintained at 180° F. throughout the drying process.

Example II

Flour mill wastes consisting of water and 500 pounds of solids were introduced, 16 hours after their formation, into a clarifier and the material permitted to thicken for about 20 minutes. After thickening, the wastes were passed by a sludge pump to an Eimco vacuum filter and the water content reduced to about 68%. The resulting partially dried product was then introduced into a steam heated rotary type drier and the moisture content was further reduced to 14%. The dry material taken from the drier was in the form of a dried cake and was then packaged. The drier was maintained at a temperature of 170° F. throughout the drying operation.

Example III

The process was carried out exactly as in Example I, except that the flour mill wastes were introduced into the clarifier 4 hours after their formation.

In all of the above examples, the dry nutrient obtained had a relatively high fat and protein content while the ash content of the product was atractively low. The results were considered excellent and the dried product was immediately salable and usable as an animal feed. The thickening action in the clarifier occurred rapidly and quite effectively while there was negligible gelatin formation to impede the clarifying process and clog the filters, pumps, etc.

While in the foregoing specification I have set out in considerable detail examples of my process and apparatus for carrying out the same for purposes of illustration, it is apparent that changes in the details may be made by those skilled in the art without departing from the spirit of my invention.

I claim:

1. In a process for treating flour mill wastes, consisting primarily of wheat wash water and wheat solids, to recover an animal nutrient that is relatively high in fat and protein content, the steps of thickening said wastes within about 16 hours after their formation, whereby the fats and proteins have not dissipated to an appreciable extent into the wash water and an extensive formation of a thick paste is not present, filtering the thickened wastes to further reduce the moisture content thereof, and thereafter drying the wastes.

2. The process of claim 1 wherein the moisture content of the wastes is in the range of about 12% to 14% after the drying thereof.

3. The process of claim 2 in which the moisture content of the wastes is in the range of about 63% to 68% after the filtering thereof.

References Cited in the file of this patent

UNITED STATES PATENTS

| | | |
|---|---|---|
| 254,240 | Roat et al. | Feb. 28, 1882 |
| 345,703 | Lafferty | July 20, 1886 |
| 653,645 | Woolner et al. | July 10, 1900 |
| 2,292,769 | Pattee | Aug. 11, 1942 |